United States Patent Office 3,562,217
Patented Feb. 9, 1971

3,562,217
CROSSLINKED AROMATIC AMIDE-IMIDE POLYMERS FOR HIGH TEMPERATURE RESISTANT WIRE ENAMELS
Edmund J. Zalewski and John L. Simonian, Schenectady, N.Y., assignors to Schenectady Chemicals, Inc., Schenectady, N.Y., a corporation of New York
No Drawing. Filed May 31, 1968, Ser. No. 733,273
Int. Cl. C08g 20/32
U.S. Cl. 260—63　　　　　　　　　　　　　　　　24 Claims

ABSTRACT OF THE DISCLOSURE

Cross-linked aromatic-amide-imide polymers are prepared by reacting trimellitic anhydride, trimesic acid and an aromatic diisocyanate, preferably diphenylmethane diisocyanate. Preferably there is added terephthalic acid and/or pyromellitic dianhydride or benzophenone dianhydride. The products are useful as wire enamels giving good appearance with heavy builds on the wire and exceptionally high cut-through temperatures.

The present invention is directed to the preparation of cross-linked aromatic amide-imide polymers useful in preparing high temperature resistant wire enamels.

The preparation of aromatic amide-imide reaction products from trimellitic anhydride and a diisocyanate is known, see Muller U.S. Pat. No. 3,314,923 and Hitachi French Pat No. 1,473,600. Other patents showing introduction of the trimellitic acid nucleus into an imide polymer include Belgian Pat. No. 650,979, Schmidt U.S. Pat. No. 3,306,771, Anderson U.S. Pat. No. 3,238,181, Lavin U.S. Pat. No. 3,260,691 and Lavin U.S. Pat. No. 3,347,-828. The use of dianhydrides in forming polyimide resins is illustrated by Lavin U.S. Pat. No. 3,190,856, Edwards U.S. Pat. No. 3,179,634.

The preparation of foamed products from trimellitic anhydrides and diisocyanate is shown in Bolton U.S. Pat. No. 3,072,614 and Frey U.S. Pat. No. 3,300,420.

None of the products disclosed in the patents set forth above have all the properties which are desirable in forming a wire coating.

Accordingly it is an object of the present invention to prepare novel amide-imide polymers.

Another object is to prepare an electrical conductor coated with such a polymer and having improved properties.

A further object is to prepare a wire enamel which imparts higher cut-through values when applied to a wire.

Yet another object is to prepare wire enamels giving good appearance and heavy build when applied to the wire.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting trimellitic anhydride, trimesic acid and an aromatic diisocyanate, preferably diphenylmethane diisocyanate. Preferably there is also added terephthalic acid or isophthalic acid, most preferably terephthalic acid. There is also preferably added an aromatic dianhydride such as pyromellitic dianhydride and/or benzophenone dianhydride (3,4,3',4'-benzophenone tetracarboxylic dianhydride). Less preferably other aromatic dianhydrides can be used such as 2,3,6,7-naphthalene tetracarboxylic dianhydride, 3,3',4,4'-diphenyl tetracarboxylic dianhydride, 2,2',3,3'-diphenyl tetracarboxylic dianhydride, 1,2,5,6-naphthalene tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic dianhydride, bis(3,4-dicarboxyphenyl) ether dianhydride, 2,2-bis(2,3-dicarboxyphenyl) propane dianhydride, 1,1-bis(2,3-dicarboxyphenyl) ethane dianhydride, bis(2,3-dicarboxyphenyl) methane dianhydride, benzene-1,2,3,4-tetracarboxylic dianhydride, pyrazine-2,3,5,6-tetracarboxylic dianhydride, 1,4,5,8-naphthalene tetracarboxylic dianhydride.

It is critical that the equivalents of diisocyanate equal the total equivalents of acids and anhydrides. Each isocyanate group is considered to be one equivalent. Similarly each anhydride group is considered to be one equivalent and each free carboxylic acid group is considered to be one equivalent.

If the total equivalents of isocyanate groups is not substantially equal to the total equivalents of anhydride and carboxylic acid groups the products of the present invention are not obtained. Thus if 1.1 equivalents or higher of diisocyanate is employed per total equivalent of anhydride and carboxylic acid a satisfactory wire enamel cannot be obtained since no storage stability is possible. If 2 equivalents of isocyanate are employed per total equivalent of anhydride and carboxylic acid essentially monomeric products terminating in isocyanate groups are obtained similar to the products set forth in Muller.

Likewise if too little isocyanate is employed, e.g. 0.9 equivalent or less per total equivalent of anhydride and carboxylic acid the product obtained is either not storage stable or is essentially monomeric.

As the aromatic diisocyanate there is preferably employed 4,4'-diisocyanatodiphenyl methane. Other aromatic diisocyanates which can be used include toluene diisocyanate (either the 2,4-isomer, the 2,6-isomer or mixtures of such isomers), 4,4'-bi-o-tolylene diisocyanate (Isocyanate 136T),
4,4'-methylene-di-o-tolylisocyanate (Hylene DDM),
m-phenylene diisocyanate,
4-methoxy-1,3-phenylene diisocyanate,
4-chloro-1,3-phenylene diisocyanate,
4-isopropyl-1,3-phenylene diisocyanate,
2,4'-diisocyanatodiphenyl ether,
4,4'-diisocyanatodiphenyl ether,
3,3'-dimethyl-4,4'-diisocyanatodiphenyl methane,
mesitylene diisocyanate,
durylene diisocyanate,
3,3'-bitolylene-4,4'-diisocyanate,
1,5-naphthalene diisocyanate,
4,4'-diisocyanotodiphenyl sulfone.

Using a stoichiometric amount of the diisocyanate, preferably 4,4'-diphenylmethane diisocyanate, the proportions of materials employed are as follows.

Trimesic acid 0.5 to 7.5 equivalent percent
Terephthalic acid (or isophthalic acid) 0 to 20 equivalent percent
Trimellitic anhydride 2.5 to 49.5 equivalent percent
Aromatic dianhydride 0 to 25 equivalent percent
Aromatic diisocyanate 50 equivalent percent.

When terephthalic acid or isophthalic acid is employed it is preferably present in an amount of at least 1 equivalent percent. Similarly when a dianhydride is employed it is preferably present in an amount of at least 1 equivalent percent. Pyromellitic dianhydride is preferably used in an amount not over 7.5 equivalent percent. If pyromellitic anhydride and benzophenone dianhydride are employed together the pyromellitic anhydride can be up to 7.5 equivalent percent and the benzophene dianhydride can be up to 17.5 equivalent percent.

The reaction between the diisocyanate and the acidic materials can be carried out in the absence of a catalyst but preferably a tertiary amine catalyst is employed, e.g. in an amount of 1 to 30% of the weight of the total acid materials. Suitable tertiary amines inclue triethylamine, tripropyl amine, diethyl propylamine, tributyl amine, triisobutyl amine, triamyl amine, methyl diethyl amine, triphenyl amine, N,N-dimethyl aniline, N,N-diethyl aniline, N-ethyl-N-benzyl aniline, triphenyl phosphate.

The polyamide-imide forming reaction is normally carried out in the presence of the same solvents used to form the wire enamel. Thus there can be used N-methyl pyrrolidone, dimethyl acetamide, dimethyl formamide, dimethylsulfoxide, N-methyl caprolactam, hexamethyl phosphoramide, cresylic acid, p-cresol, m-p-cresol mixture, dimethyl sulfone, tetrahydrofuran, phenol. Mixtures of solvents can be used, e.g. blends of N-methyl pyrrolidone with dimethyl acetamide and/or dimethyl formamide, a mixture of N-methyl pyrrolidone, dimethyl acetamide and toluene (6:3:4); a mixture of N-methyl pyrrolidone and xylene.

Both aliphatic and aromatic hydrocarbons can be used as diluents, e.g. aromatic naphthas such as Solvesso 100, toluene, xylene, and aliphatic hydrocarbons such as octane, decane, dodecane and tetradecane.

The polyamide-polyimide (or polyamide-polyimide-polyurea) is employed as a wire enamel while in solution in a solvent system such as those specified above. It is applied to an electrical conductor, e.g. copper, silver, aluminum or stainless steel wire in conventional fashion, e.g. by the "free dip" method or the "die application" procedure both of which procedures are described in Meyer Pat. 3,201,276. Wire speeds of 15 to 36 feet per minute can be used with wire tower temperatures of 250 to 800° F., usually with a final temperature of above 500° F. The build-up of the polyamide-imide enamel on the wire can be 0.005 to 0.010 inch, preferably 0.002 to 0.004 inch using No. 18 wire. The wire is passed through the enamel one or more times until the desired build up is obtained. (The build-up is the total increase in diameter over the bare wire diameter.)

Unless otherwise indicated all parts and percentages are by weight. All viscosities in the examples are Gardner-Holdt viscosities.

The polyamide-imide coated wires of the present invention can be top coated with conventional top coats such as the conventional polyimides shown in Smith Pat. 3,168,417, col. 2, line 34 to col. 3, line 69 and Edwards Pat. 3,179,634, col. 1, line 16 to col. 2, line 28, col. 5, line 61 to col. 6, line 53, Examples 1–35. Other conventional top coats can be employed such as those made from nylon and Dacron such as shown in Sheffer-Jordan Pat. 3,141,859.

Other insulations can be used with the polyamide-imide of the present invention such as varnishes shown in the Thielking Pat. 3,080,311. A typical varnish within the Thielking Pat. is Isonel 31 which is a varnish made by heating soybean oil with glycerine and isophthalic, and dissolving the product together with p-t-butyl-phenol-bis-(4-hydroxyphenyl) propane-formaldehyde in a mixture of xylene and mineral spirits. There can also be employed Isonel 51 which is similar to Isonel 31 except that the glycerine is replaced by tris(2-hydroxy-ethylisocyanate).

The cross-linked products of the present invention frequently have cut-through temperatures above 350° F. and even as high as 400° C. and above while at the same time having good appearance with heavy builds (2.6 to 3.0 mils).

EXAMPLE 1

Diphenylmethane diisocyanate: 251 grams (1 mole)
Trimellitic anhydride: 182 grams (0.95 mole)
Trimesic acid: 11 grams (0.05 mole)
N-methyl pyrrolidone: 1140 grams All of the materials were added to a flask to form a solution in the N-methyl pyrrolidone. The ingredients were heated to 300° F. in 1.5 hours and then held at 300° F. for a period of 3 hours. The reaction product was cooled to room temperature and filtered. The final viscosity was about $Z_2$ at 25% solids content.

EXAMPLE 2

Diphenylmethane diisocyanate: 251 grams (1 mile)
Trimellitic anhydride: 173 grams (0.9 mole)
Trimesic acid: 14.1 grams (0.067 mole)
N-methyl pyrrolidone: 1050 grams All the materials were charged into a 3 liter flask and heated to 380° F. in 1 hour and then held at 380° F. for 2 hours. The reaction product was cooled to 200° F. and filtered. The final viscosity was $Z_3$–$Z_4$ at 29.6% solids.

EXAMPLE 3

Diphenylmethane diisocyanate: 251 grams (1 mole)
Trimellitic anhydride: 182 grams (0.95 mole)
Trimesic acid: 7 grams (0.033 mole)
N-methyl pyrrolidone: 1408 grams All the ingredients were added to a 3 liter flask and heated to 300° F. in 1 hour. The temperature of 300° F. was maintained for 0.5 hour, then raised to 400° F. over a period of 1.5 hours. The reaction product was cooled and filtered. The final viscosity was $Z_1$–$Z_2$ at 24% solids.

The following tests were carried out on No. 18 copper wire coated by the die application procedure using the wire enamels of the indicated examples. The wire tower temperature in all cases was 750° F.

TABLE 1

| | Speed, ft./min. | Appearance | Build (mils) | Cut-through, °C. | Heat shock, 20% stretch ½ hour at 240° C. | | | |
|---|---|---|---|---|---|---|---|---|
| | | | | | 1X | 2X | 3X | 4X |
| Example: | | | | | | | | |
| 1 | 30 | Good | 2.6 | 378–350 | | | | |
| 1 | 33 | do | 2.6 | 338–302 | 0 | 0 | 80 | 90 |
| 2 | 33 | do | 2.9 | 358–400 | 0 | 40 | 80 | 90 |
| 3 | 27 | do | 3.0 | 331 | 0 | 100 | 100 | 100 |
| 3 | 30 | Very slightly wavy | 2.5 | 335–335 | 0 | 90 | 100 | 100 |
| 3 | 33 | Specks | 2.9 | 300–322 | 30 | 90 | 80 | 100 |

In the following Examples 4–15 the polyamide-imides were made by a procedure similar to that used in Examples 1 to 3 except that the indicated materials were charged into a reaction kettle and heated to 180° C. over a period of 2–3 hours. In Examples 4–12 triethyl amine was employed as a catalyst, in Examples 13–15 diphenyl oxide was employed as a solvent. In the Examples Sol. is an abbreviation for Solvesso 100, Hi Fl. is an abbreviation for high flash naphtha and E.W. is an abbreviation for enamel wire naphtha. The viscosities in Examples 4–15 were all measured at 18% solids.

TABLE 2

| | Trimesic acid, g.(moles) | Benzophenone dianhydried, g.(moles) | Pyromellitic dianhydride, g.(moles) | Trimellitic anhydride, g.(moles) | Terephthalic acid, g.(moles) | 4,4'diphenylmethane diisocyanate, g.(moles) | Triethyl amine, grams | N-methyl pyrrolidone | Diluent type, grams | Viscosity |
|---|---|---|---|---|---|---|---|---|---|---|
| Example: | | | | | | | | | | |
| 4 | 5.25(0.025) | | 11(0.05) | 60(0.3125) | 17(0.1) | 127(0.505) | 3.5 | 622 | Sol, 180 | $Z_3+$ |
| 5 | 7(0.33) | | 22(0.1) | 125(0.65) | 33(0.2) | 253(1.01) | 7 | 1,243 | Sol, 361 | $Z_2$ |
| 6 | 7(0.03) | | 22(0.1) | 115(0.60) | 42(0.25) | 253(1.01) | 7 | 1,239 | Sol, 360 | $Z_2+$ |
| 7 | 7(0.03) | | 22(0.1) | 106(0.55) | 33(0.2) | 253(1.01) | 7 | 1,224 | Sol, 361 | $Z_4+$ |
| 8 | 7(0.03) | | 22(0.1) | 125(0.65) | 33(0.2) | 253(1.01) | 7 | 1,243 | Sol, 361 | $Z_4+$ |
| 9 | 7(0.00) | | 27(0.125) | 91(0.475) | 58(0.35) | 253(1.01) | 7 | 1,585 | | $Z_5+$ |
| 10 | 7(0.03) | | 27(0.125) | 91(0.475) | 58(0.35) | 253(1.01) | 7 | 1,268 | Hi Fl., 317 | $Z_4+$ |
| 11 | 7(0.03) | | 27(0.125) | 91(0.475) | 58(0.35) | 250(1.0) | 7 | 1,268 | E.W., 317 | $Z_4+$ |
| 12 | 7(0.03) | 48(0.15) | 27(0.125) | 62(0.325) | 58(0.25) | 250(1.0) | 7 | 1,326 | E.W., 332 | $Z_3+$ |
| 13 | 7(0.03) | | 27(0.125) | 91(0.475) | 58(0.35) | 250(1.0) | 1 | 1,189 | E.W., 317 | $Z_5$ |
| 14 | 7(0.03) | | | 115(0.60) | 58(0.35) | 250(1.0) | 1 | 1,168 | E.W., 312 | $Z_3$ |
| 15 | 7(0.03) | 97(0.30) | | 125(0.65) | | 250(1.0) | 1 | 1,336 | E.W., 356 | $Z_2+$ |

[1] Diphenyl oxide.

The following tests were carried out on No. 18 copper wire coated by the die application procedure using the wire enamels of the indicated examples. The wire tower temperature is indicated in the speed column. The results are set forth in Table 3.

TABLE 3

| | Speed ft./min. | Appearance | Build | Mandrel Before snap | Mandrel after snap | Cut-through °C. (2,000 g.) | Heat shock 20% stretch, ½ hr. at 260° C. | Burn out Unvarnished, kv. | Varnished, kv. Isonel 31 | Isonel 51 |
|---|---|---|---|---|---|---|---|---|---|---|
| Example: | | | | | | | | | | |
| 4 | 26(650° F.) | Good | 2.6 | 1X | 2X | 330-312 | 50-100-100-100 | | | |
| 5 | 26(650° F.) | do | 2.7 | 1X | 2X | 380-360 | 60-90-100-100 | | | |
| 6 | 26(650° F.) | do | 2.6 | 1X | 2X | 378-390 | 40-100-100-100 | | | |
| 7 | 26(650° F.) | do | 2.6 | 1X | 2X | 310-332 | 80-100-100-100 | | | |
| 8 | 27(650° F.) | do | 2.6 | 1X | 3X | 362-380 | 60-100-100-100 | | | |
| 9 | 26(650° F.) | do | 2.6 | 1X | 2X | 405-385 | 30-80-100-100 | | | |
| 9 | 26(650° F.) | do | 2.7 | 1X | 1X | 370-380 | 20-90-90-100 | 5.7 | 1.42 | 6.2 |
| 10 | 24(750° F.) | do | 2.6 | 1X | 5X | 410-450 | 0-10-10-70-70 | 6.9 | 1.7 | |
| 10 | 27(750° F.) | do | 2.6 | 1X | 2X | 395-402 | 0-70-80-100 | 5.1 | 1.4 | |
| 11 | 27(750° F.) | do | 2.7 | 1X | 3X | 450+-450+ | 10-60-100-100 | 3.4 | 1.33 | |
| 12 | 27(750° F.) | do | 2.7 | 1X | 3X | 410-450+ | 0-100-90-100 | 6.6 | 3.8 | |
| 12 | 27(750° F.) | do | 2.7 | 1X | 3X | 410-450+ | 10-80-90-100 | 6.0 | 3.1 | 9.2 |
| 13 | 27(750° F.) | do | 2.8 | 1X | 4X | 420-390 | 20-40-50-70 | 7.66 | 1.21 | |
| 14 | 27(750° F.) | do | 2.7 | 1X | 3X | 382-403 | 0-40-70-90 | 8.0 | 1.23 | |
| 15 | 27(750° F.) | Very slighty wavy | 2.7-2.8 | 1X | 4X | 335-330 | | 9.3 | 4.9 | |
| 12 | 30(750° F.) | Good | 2.7-2.8 | 1X | 2X | 380-352 | 10-60-90-100 | 7.4 | | 9.1 |
| 12 | 27(750° F.) | do | 2.7 | 1X | 3X | 415-408 | 0-80-70-90 | | | |
| 12 | 30(750° F.) | do | 2.8 | 1X | 3X | 418-395 | 0-80-90-100 | | | |

EXAMPLE 16

Add to a kettle 26,490 parts of N-methyl pyrrolidone, 1,440 parts of trimellitic anhydride, 1,162 parts of terephthalic acid, 545 parts of pyromellitic anhydride, 966 parts of benzophenone dianhydride, 140 parts of trimesic acid, 5,000 parts of 4,4'-diphenylmethane diisocyanate and 140 parts of triethyl amine. Heat to about 360° F. in about 40 minutes. Then add 6,521 parts of EW naphtha (enamel wire naphtha) and reduce the temperature to about 365° F. and maintain this temperature until a viscosity of $Z_2$-$Z_3$ is obtained. The enamel is then cooled. At room temperature the viscosity is $Z_3$-$Z_5$, the specific gravity 1.065 and there are 18% solids. Example 16 illustrates a preferred wire enamel according to the invention.

What is claimed is:

1. An aromatic amide-imide polymer consisting essentially of the reaction product of trimellitic anhydride, trimesic acid and an aromatic diisocyanate, the equivalents of diisocyanate equaling about the total equivalents of all acids and anhydrides.

2. A polymer according to claim 1 wherein the amount of trimesic acid is 0.5 to 7.5 equivalent percent based on the total equivalents of all acids, anhydrides and diisocyanates.

3. A polymer according to claim 2 wherein the diisocyanate is 4,4'-diphenylmethane diisocyanate.

4. A polymer according to claim 1 including as a reactant member of the group consisting of terephthalic acid and isophthalic acid.

5. A polymer according to claim 4 wherein said member is terephthalic acid and is present in an amount of 1 to 20 equivalent percent based on the total equivalents of all acids, anhydrides and diisocyanates.

6. A polymer according to claim 5 wherein the diisocyanate is 4,4'-diphenylmethane diisocyanate.

7. A polymer according to claim 1 including as a reactant an aromatic dianhydride.

8. A polymer according to claim 7 wherein the dianhydride is present in an amount of 1 to 25 equivalent percent based on the total equivalents of all acids, anhydrides and diisocyanates and the trimesic acid is present in an amount of 0.5 to 7.5 equivalent percent.

9. A polymer according to claim 8 wherein the dianhydride is selected from the group consisting of benzophenone dianhydride and pyromellitic dianhydride.

10. A polymer according to claim 9 wherein the diisocyanate is 4,4'-diphenylmethane diisocyanate.

11. A polymer according to claim 1 including as reactants (1) a member of the group consisting of terephthalic acid and isophthalic acid and (2) an aromatic dianhydride.

12. A polymer according to claim 11 wherein the dianhydride is a member of the group consisting of benzophenone dianhydride and pyromellitic dianhydride.

13. A polymer according to claim 12 wherein the member of the group (1) is terephthalic acid and is present in an amount of 1 to 20 equivalent percent, the trimesic acid is present in one amount of 0.5 to 7.5 equivalent percent, the dianhydride is present in an amount of 1 to 25 equivalent percent and the trimellitic anhydride is present in an amount of 2 to 47.5 equivalent percent, all equivalent percents being based on the total equivalents of all acids, anhydrides and diisocyanates.

14. A polymer according to claim 13 consisting of the reaction product of 0.033 mole trimesic acid, 0.15 mole benzophenone dianhydride, 0.125 mole pyromellitic dianhydride, 0.325 mole trimellitic anhydride, 0.35 mole terephthalic acid and 1.0 mole of 4,4'-diphenylmethane diisocyanate.

15. A wire enamel comprising the polymer of claim 14 dissolved in a solvent comprising N-methyl pyrrolidone.

16. An electrical conductor coated with the polymer of claim 14.

17. An electrical conductor coated with the polymer of claim 1.

18. An electrical conductor according to claim 17 wherein the diisocyanate is diphenylmethane diisocyanate and the trimesic acid is 0.5 to 7.5 equivalent percent and the trimellitic acid is up to 49.5 equivalent percent, all equivalent percents being based on the total equivalents of acids, anhydrides and diisocyanates.

19. An electrical conductor according to claim 17 wherein the coating includes as a reactant terephthalic acid in an amount of 1 to 20 equivalent percent and the trimesic acid is present in an amount of 0.5 to 7.5 equivalent percent.

20. An electrical conductor according to claim 17 wherein the coating includes as a reactant an aromatic dianhydride in an amount of 1 to 25 equivalent and the trimesic acid is present in an amount of 0.5 to 7.5 equivalent percent.

21. An electrical conductor according to claim 20 wherein the aromatic dianhydride is selected from the group consisting of pyromellitic dianhydride and benzophenone dianhydride.

22. An electrical conductor according to claim 21 wherein the polymer contains 0.5 to 7.5 equivalent percent of pyromellitic dianhydride and 1 to 17.5 equivalent percent of benzophenone dianhydride.

23. An electrical conductor according to claim 22 wherein the polymer includes 1 to 20 equivalent percent of a member of the group consisting of terephthalic acid and isophthalic acid.

24. An electrical conductor according to claim 21 wherein the polymer includes as a reactant 1 to 20 equivalent percent of a member of the group consisting of terephthalic acid and isophthalic acid.

References Cited

UNITED STATES PATENTS

| | | | |
|---|---|---|---|
| 3,300,420 | 1/1967 | Frey | 260—2.5 |
| 3,314,923 | 4/1967 | Muller et al. | 260—78 |
| 3,317,480 | 5/1967 | Fetscher et al. | 260—77.5 |

WILLIAM H. SHORT, Primary Examiner

L. L. LEE, Assistant Examiner

U.S. Cl. X.R.

117—128.4, 232; 260—30.2, 30.4, 30.6, 30.8, 32.4, 32.6, 33.4, 47, 77.5, 78